United States Patent [19]

Strolle

[11] 4,446,529
[45] May 1, 1984

[54] LINEAR INTERPOLATION BETWEEN REGULARLY SPACED DIGITAL SAMPLES

[75] Inventor: Christopher H. Strolle, Philadelphia, Pa.

[73] Assignee: RCA Corporation, New York, N.Y.

[21] Appl. No.: 304,924

[22] Filed: Sep. 23, 1981

[30] Foreign Application Priority Data

Jan. 26, 1981 [GB] United Kingdom ................ 8102281

[51] Int. Cl.$^3$ .......................................... G06F 15/353
[52] U.S. Cl. .................................. 364/723; 318/573; 340/728; 364/577
[58] Field of Search .............. 364/723, 577, 721, 719; 318/573; 340/728; 84/1.03

[56] References Cited

U.S. PATENT DOCUMENTS

4,282,578  8/1981  Payne et al. ........................ 364/723

OTHER PUBLICATIONS

Seim, Thomas A., Numerical Interpolation for Microprocessor-Based Systems, Computer Design, Feb. '78 pp. 111–116.

Primary Examiner—David H. Malzahn
Assistant Examiner—Karl Huang
Attorney, Agent, or Firm—Joseph S. Tripoli; George E. Haas; Allen LeRoy Limberg

[57] ABSTRACT

The process of linearly interpolating between data taken from adjacent storage locations in a memory non-integrally addressed has the initial subtraction and final addition steps eliminated from it, and the partial products to be summed in the intervening multiplication process are modified to compensate for the elimination of these steps. This modification is done with a relatively fast select-one-of-four process, reducing the time for linear interpolation to that required for a simple multiplication--or, in the case of a single-bit multiplier, to the time for selection of the modified multiplicand to be used as linear interpolation result.

13 Claims, 5 Drawing Figures

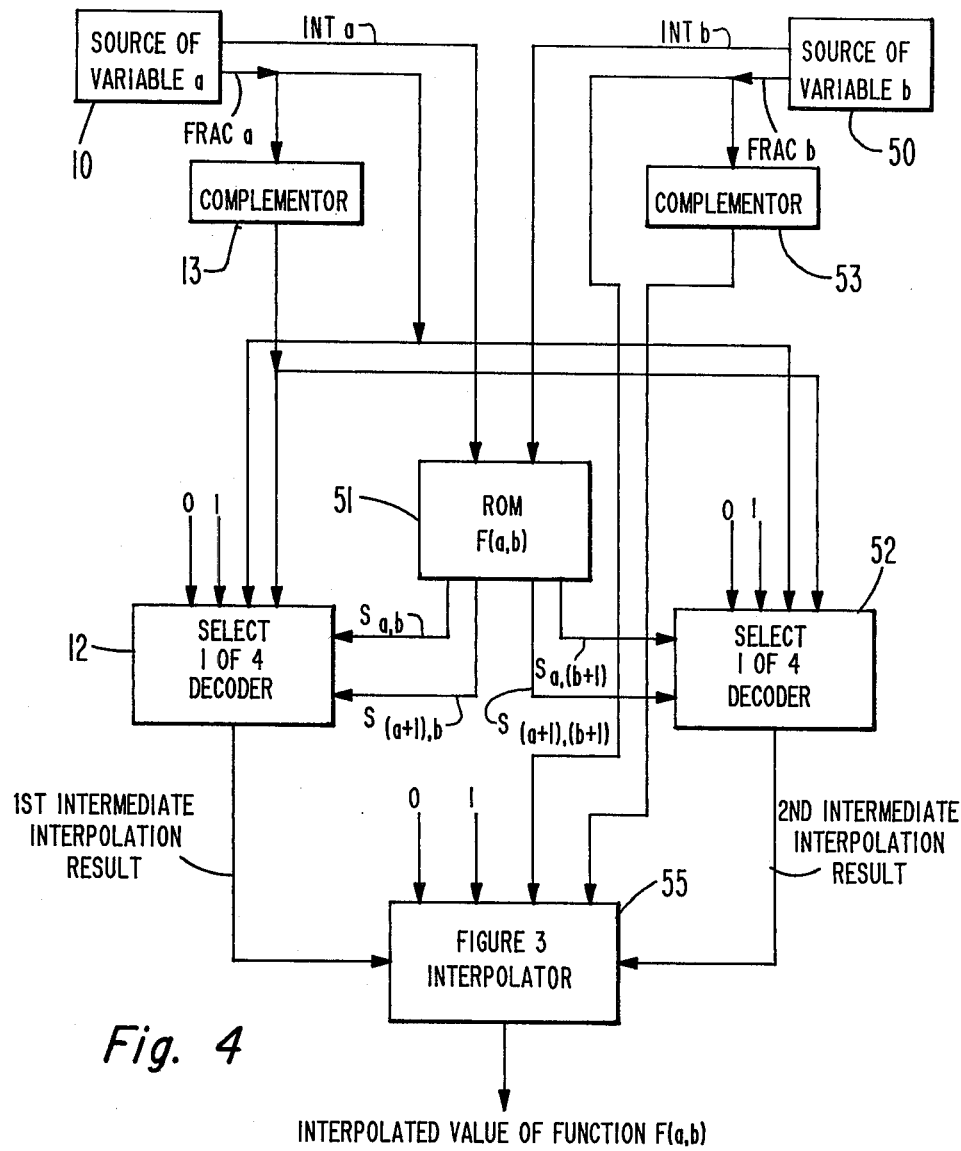
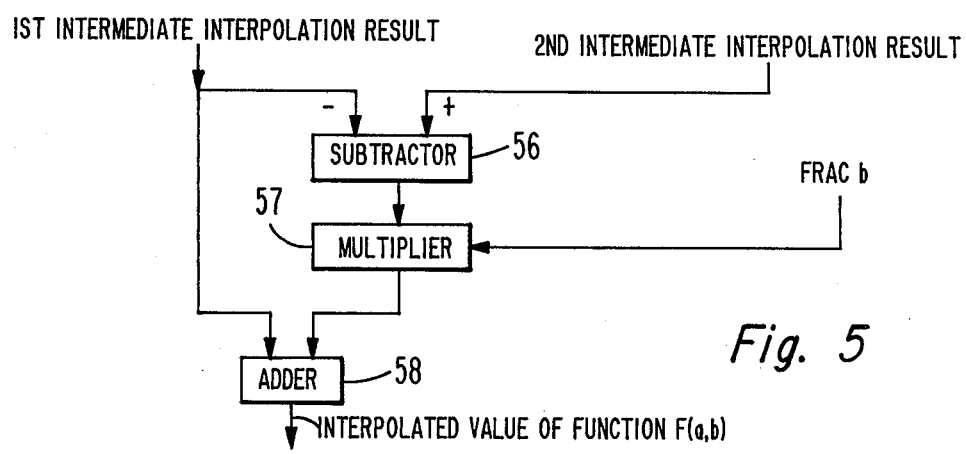

LINEAR INTERPOLATION BETWEEN REGULARLY SPACED DIGITAL SAMPLES

The present invention relates to electronic memories for digital data and, more particularly, to linear interpolation between digital samples of a function of a variable taken from the regularly spaced storage locations in such a memory addressable by integral values of the variable, which interpolation generates digital samples which approximate the value of the function at non-integral values of the variable.

With such interpolation it is possible to cut the number of addressable locations in the memory. This substantially reduces the size of the memory required to store digital samples of a function of a variable—and thus the cost of the memory. In previous work known to the inventor, linear interpolation has been carried forward by methods analogous to that used by a human when performing a linear interpolation from adjacent entries in a table of values of a function. The first step in the interpolation is differentially combining "bracketing" digital samples, at adjacent integral values of variable which bracket the actual value of variable for which an interpolated digital sample is desired. More particularly, this step involves taking a digital sample for an integral value of variable equal to the integral portion of a non-integral value of variable and subtracting the digital sample from the digital sample for the next higher integral value of the variable. The second step in the interpolation is multiplying the resulting difference by the fractional portion of the non-integral value of variable, and the third step is adding the resulting product back to the digital sample for the integral value of variable equal to the integral portion of the non-integral variable. This procedure requires time for the initial subtraction, time for the addition of partial products in the multiplication, and time for the final addition that provides the interpolation result. The lengths of these times is determined by the need to make carries in each of these processes, which are all basically addition processes.

The present invention concerns modification of the accumulation of partial products process, so that the initial subtraction and final addition processes can be dispensed with. If both corresponding bit places in the bracketing digital samples which are associated with a partial product term are ZEROs, the partial product would have to be zero-valued and would be added to a ZERO in that bit place during the final addition. So in the modified accumulation of partial products process, zero is accumulated for this condition. If both corresponding bit places in the bracketing digital samples which are associated with a partial product term are ONEs, the partial product would have to be zero-valued, but it would be added to a ONE in that bit place during the final addition. So in the modified accumulation of partial products process, unity (rather than zero) with the bit-place shift associated with the partial product is accumulated in accordance with the invention for this condition. If the corresponding bit places in the bracketing samples for lower and upper values of variable are respectively ZERO and ONE, the partial product would be a positive number, the fractional portion of the variable, and would be added to a number with ZERO in that bit place during the final addition. So in the modified accumulation of partial products process, the fractional portion of the variable with the bit place shift associated with the positive partial product is accumulated for this condition. If the corresponding bit places in the bracketing samples for the lower and upper values of variable are respectively ONE and ZERO on the other hand, the partial product would be a negative number with amplitude equal to the fractional portion of the variable and would be added to a ONE in that bit place in the final addition process. A comparable final result is achieved in the modified partial product accumulation process in accordance with the invention by accumulating the component of the fractional portion of the variable with the bit-place shift associated with the replaced partial product, or by accumulating a close approximation to the complement by inverting the bits of a multiple-bit-place function. In the special case where the digital samples being interpolated between are single-bit samples, interpolation becomes simply a matter of selecting zero, unity, the fractional portion of the variable, or its complement as the final interpolation result with no time being taken for addition processes with carries.

In the drawing:

FIG. 4 is a block diagram of memory for storing a function of variables a and b; and associated two-dimensional interpolation apparatus in accordance with an aspect of the invention; and FIG. 5 is a block diagram of a modification of FIG. 4 circuitry embodying another aspect of the invention.

Figure 1:
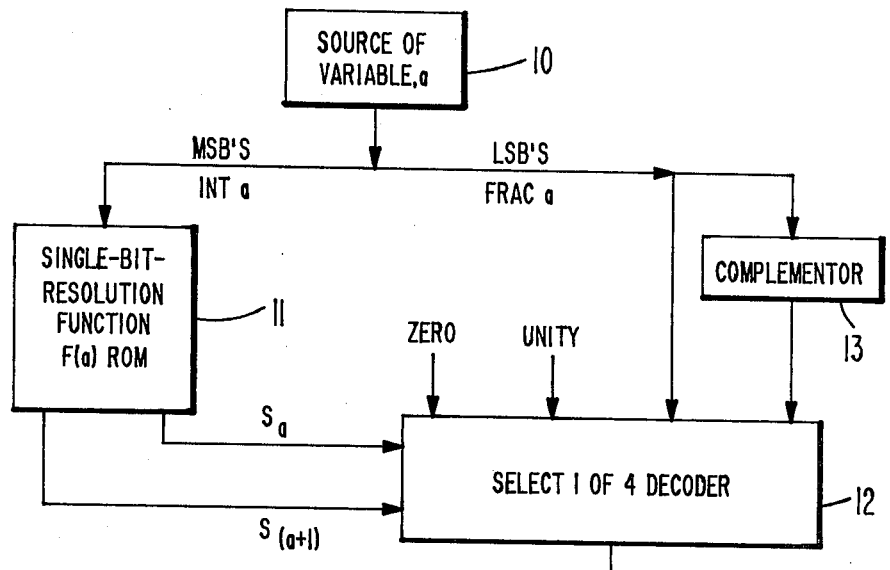
FIG. 1 is a block diagram of memory for storing a single-bit function of a variable a in coarser resolution memory and apparatus for recovering values of that function for finer resolution values of a, using linear interpolation in accordance with an aspect of the invention.

In FIG. 1 source 10 generates binary numbers descriptive of a variable, a, which have greater resolution than afforded by a read-only memory ROM 11 used to store digital data sampling a function F(a) of the variable a. Each of the binary numbers descriptive of a can be considered to have an integral portion int a descriptive of storage locations in ROM 11 that are addressable and to have a fractional portion frac a descriptive of the excess resolution or residue of a, which residue is to be used to control interpolation between samples at the closest integral addresses in ROM 11.

ROM 11 is of a type which responds to int a input to supply as read-out the digital data descriptive of samples $S_a$ and $S_{(a+1)}$ of F(a) at value int a and at value (int a)+1, respectively. ROM 11 may use a pair of spatially multiplexed component ROM's to this end as described by L. A. Christopher, G. A. Reitmeier, T. R. Smith and C. H. Strolle in U.S. patent application Ser. No. 298,268 filed Aug. 31, 1981 and entitled "WINDOW-SCANNED MEMORY." Alternatively, ROM 11 may be serially read at the two points and buffer registers used to supply the samples $S_a$, $S_{(a+1)}$ contemporaneously for purposes of interpolation between them, although this undesirably increases the rate at which memory must be accessed. Or if one is willing to accept the duplication of memory two ROM's with offset addressing may be used to supply respectively the samples $S_a$ and $S_{(a+1)}$.

The samples $S_a$ and $S_{(a+1)}$ supplied by ROM 11 in FIG. 1 are single-bit in nature, and these two bits are applied as control signals to a select one-of-four decoder 12. Responsive to samples $S_a$ and $S_{(a+1)}$ both being ZEROs, a binary number having ZEROs in each of its places and describing zero value is selected as the interpolated value of F(a). Responsive to samples $S_a$ and $S_{(a+1)}$ both being ones, a binary number having ZEROs in each of its places except its $2^0$ place is selected as the interpolated value of F(a). Responsive to samples $S_a$ and $S_{(a+1)}$ being ZERO and ONE, respectively, frac a as provided from source 10 is selected to be forwarded without complementing as the interpolated value of F(a). Responsive to samples $S_a$ and $S_{(a+1)}$ being ONE and ZERO, respectively, the output $\overline{\text{frac a}}$ of a complementor circuit 13 supplied frac a as input is selected as the interpolated value of F(a).

Figure 2:
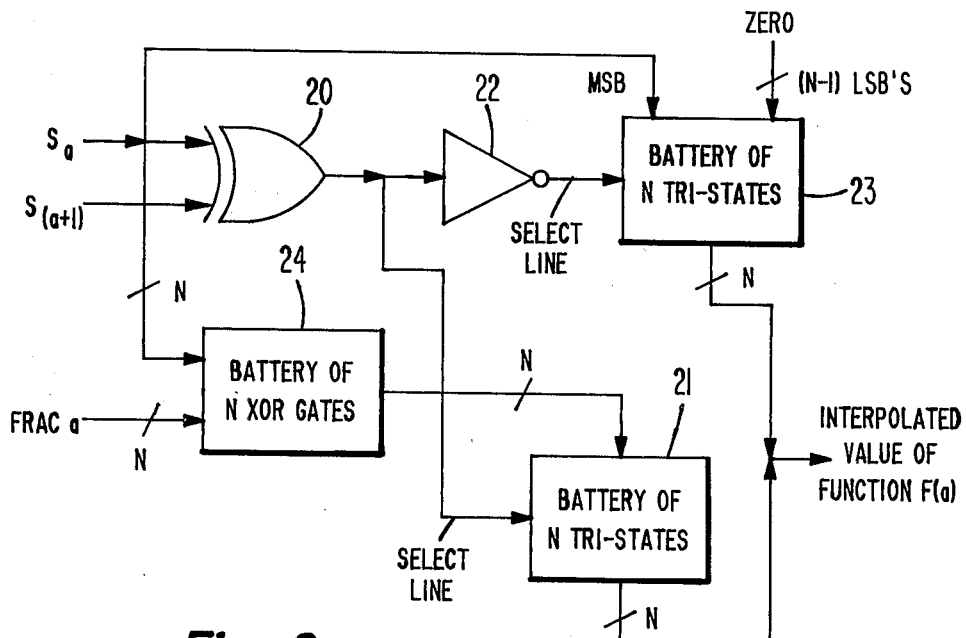
FIG. 2 is a schematic diagram of circuitry useful in a portion of the FIG. 1 apparatus, in accordance with another aspect of the invention.

FIG. 2 shows representative circuitry for realizing the functions of both select one-of-four decoder 12 and complementor circuit 13. The exclusive-OR gate (XOR gate) 20 responds with a ZERO output to $S_a$ and $S_{(a+1)}$ both being either ONE or ZERO. This ZERO output applied to the select line to which enable inputs of a battery 21 of tri-states, n in number, connect conditions each of them to be in its high-output-impedance state and thus be ineffective in determining F(a) one-of-four selector output. The ZERO output of XOR gate 20 is inverted to ONE by logic inverter 22. This ONE applied to the enable inputs of a second battery 23 of tri-states, n in number, conditions each to be in a low-output-impedance state and to forward the signals applied to their signal inputs. The ONE or ZERO value of $S_a$ is forwarded as the most significant bit of battery 23 output, which is F(a) one-of-four selector output; and ZERO's are forwarded as the less significant bits.

XOR gate 20 responds to one of $S_a$ and $S_{(a+1)}$ being ZERO and the other being ONE to supply an output ONE, which inverted to ZERO by logic inverter 22 conditions each of the battery 23 of tri-states to be in its high-output-impedance state and thus be ineffective in determining F(a) one-of-four selector output. The ONE output of XOR gate 20 applied to the select line to which enable inputs of battery 21 of tri-state connects to condition them to forward the outputs of a battery 24, n in number, of XOR gates as F(a) one-of-four select output. These XOR gates receive respective bits of frac a on their first inputs and receive $S_a$ on their second inputs. If $S_a$ be ZERO, frac a appears at the outputs of battery 24 of XOR gates to be forwarded by battery 21 of tri-states as F(a) one-of-four selector output. If $S_a$ be ONE, frac a is complemented by battery 24 of XOR gates, and battery 21 of tri-states forwards $\overline{\text{Frac a}}$ as F(a) one-of-four selector output.

Linear interpolation between single-bit samples is useful in performing the preliminary steps in a two-dimensional spatial interpolation from bit-map display memories scanned by phantom raster, for example. But, in the later steps of such a two-dimensional interpolation process, as well as in many other applications, it is desirable to interpolate between two plural-bit samples of a function. Interpolation between plural-bit numbers can be carried out according to the invention by relying on the distributive properties of binary numbers. That is, each binary number is considered as a sum of powers of two multiplied by ONE or ZERO.

Figure 3:
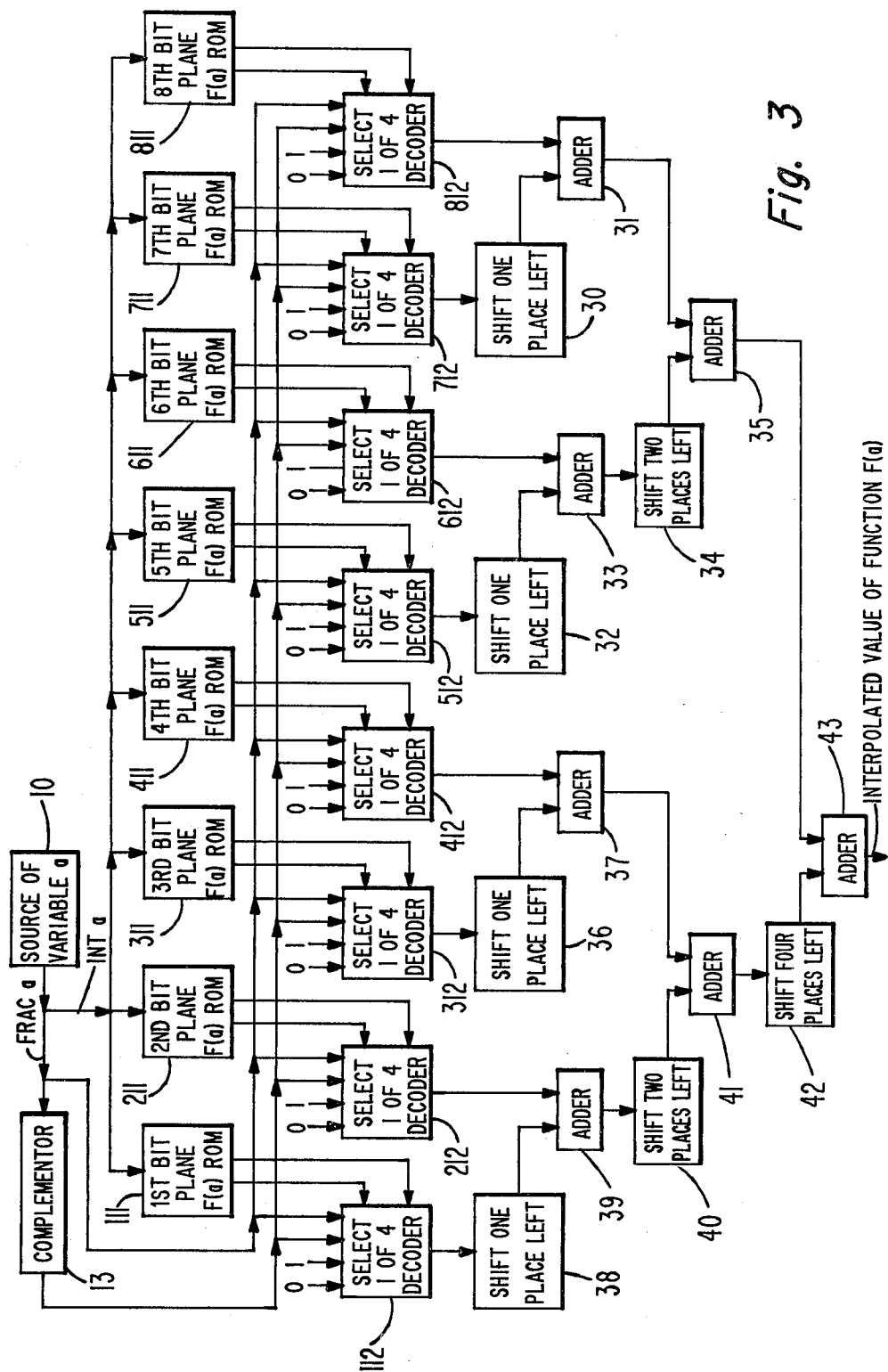
FIG. 3 is a block diagram of memory for storing a plural-bit function of a variable a and linear interpolation apparatus in accordance with an aspect of the invention.

FIG. 3 shows representative plural-bit interpolation apparatus embodying the present invention. The apparatus handles eight-bit samples of F(a) with the first-, second-, third-, fourth-, fifth-, sixth-, seventh-, and eighth-most significant bits of the samples stored in ROM planes 111, 211, 311, 411, 511, 611, 711 and 811, respectively, which are parallelly addressed by int a inputs from source 10. These planes supply two spatially adjacent samples as control signals to select one-of-four decoders 112, 212, 312, 412, 512, 612, 712 and 812, respectively, to control selection of zero, unity, frac a or $\overline{\text{frac a}}$ as modified partial product terms.

These partial products then have to be summed with all bits in each successive partial product shifted one place to left reflective of the power of two associated with its distributed portion of F(a). The $2^1$ portion of F(a) supplied by select one-of-four decoder 712 is shifted one place to left in its connection 30 to one input of adder 31 respective to the $2^0$ portion of F(a) from select one-of-four decoder 812 applied to the other input of adder 31. The $2^3$ portion of F(a) supplied by select one-of-four decoder 512 is shifted one place to left in its connection 32 to one input of adder 33 respective to the $2^2$ portion of F(a) supplied by select one-of-four decoder 612 to the other input of adder 33. The sum of the $2^3$ and $2^2$ portions of F(a) supplied from adder 33 output is then shifted two places to the left in its connection 34 to one input of adder 35 respective to the sum of the $2^1$ and $2^0$ portions of F(a) supplied from adder 31 output to the other input of adder 35. The $2^5$ portion of F(a) supplied by select one-of-four decoder 312 is shifted one place to left in its connection 36 to one input of adder 37 respective to the $2^4$ portion of F(a) from select one-of-four decoder 412 applied to the other input of adder 37. The $2^7$ portion of F(a) supplied by select one-of-four decode 112 is shifted one place to left in its application 38 to one input of adder 39 respective to the $2^6$ portion of F(a) supplied by select one-of-four decoder 212 to the other input of adder 39. The sum of the $2^7$ and $2^6$ portions of F(a) supplied from adder 39 output is then shifted two places to the left in its application 40 to one input of adder 41 respective to the sum of the $2^5$ and $2^4$ portions of F(a) supplied from adder 39 output to the other input of adder 41. The sum of the $2^7$, $2^6$, $2^5$ and $2^4$ portion of F(a) supplied by adder 41 as output is then shifted four places to the left in its connection 42 to one input of adder 43, which receives at its other input the sum of the $2^3$, $2^2$, $2^1$ and $2^0$ portions of F(a) from the output of adder 35. The output of adder 43 is then, the interpolated value of F(a) assembled from its distributed portions, distributed in accordance with the bit places of a.

The relative place shifts involved in the summing of the distributed portions of F(a) are of importance. Interpolation apparatus similar to that shown in FIG. 3 but where the portions of F(a) associated with less significant bit places of a are shifted progressively rightward is feasible, however. So is apparatus combining leftward shifts for positions of F(a) associated with more significant bit places of a rightward shifts for portions of F(a) associated with less significant bit places of a. The number of addition processes that have to be carried out serially in the multiplication by a $2^n$ bit binary number has the value n, 3 in the case of an eight-bit variable a. The elimination of the initial subtraction and final addition processes by interpolating in accordance with the present invention essentially saves a 2/n+2) portion of the time required for the interpolation, the propagation of carries making these linear combination processes or signed addition processes the most significant delays in the interpolation process whether practiced in accordance with the prior art or the invention. There can be a slight additional time saving where F(a) is always of one sense, since the interpolation calculations according to the invention involve only additions, not subtraction, and can be carried forward in ordinary binary numbers rather than in a signed binary number system such as two's complement; this reduces by one the number of carries that need to be made in each addition process. Assuming the select-one-of-four decoding operation to be instantaneous, then, ideally the time for interpolation according to the invention is somewhat shorter than n/(n+2) times as long as by prior art procedure, in instances where carries are propagated in each step of addition. That is, less than 3/5 as much time can be expected to be required for interpolating between two values of an eight-bit variable a—nearly a two-to-one speed advantage.

Consider now the possibilities of adapting the new, faster methods of digital multiplication, where carries are not propagated in each step of combining partial products, to the combining of partial products modified per the present invention. Booth's algorithm relies on the multiplicand and multiplier remaining the same for each successive partial product, so the multiplier can be dealt with two bits at a time rather than one bit at a time; this conflicts with the select-one-of-four process of the present invention. C. S. Wallace in a paper entitled "A Suggestion for a Faster Multiplier" appearing in *IEE TRANSACTIONS ON ELECTRONIC COMPUTERS*, vol. EC-13, pp. 14–17, Feb. 1964, describes multiplication using psuedoadders which add together three numbers but instead of producing a single sum produce two numbers the sum of which equal the sum of the original three. The psuedoadder is faster than the conventional adder because it can operate without carry propagation along its digital stages. Apparatuses which, like that which Wallace describes, can sum partial products without analysis of their interrelationship with each other can be used together with the present invention. Apparatuses of the sort described by L. Dadda in a paper entitled "Some Schemes for Parallel Multipliers" appearing in *ALTA FREQUENZA*, vol. XXXIV, pp. 349–35, May 1965 and by S. D. Pezaris in a paper entitled "A 40-ns 17-BIT by 17-Bit Array Multiplier" appearing in *IEEE TRANSACTIONS ON COMPUTERS*, vol. C-20, pp. 442–447, Apr. 1971, are adaptable for use in embodiments of the present invention. Where the summing of partial products can be carried forward more quickly, through techniques where delays owing to propagation of carries are avoided, the speed advantage of the present invention will become still more apparent. This is because the carry propagations involved in the initial subtraction and final addition processes of conventional linear interpolation are relatively more time consuming than the carry propagation in the partial product summation processes, as prorated over the number of partial products; and these slower processes must be done separately from the summation of partial products. This is because the outcome of the initial subtraction must be known to determine the multiplier or multiplicand to be used in the multiplication, and because the outcome of the multiplication process must be known to determine one of the addenda in the final addition process. In the interpolation per the invention only the faster prorated carry propagation time per addition process is required, since the initial subtraction and final addition processes have been eliminated in favor of modifying the partial products to be summed.

FIG. 4 illustrates how the invention may be used in performing a two-dimensional interpolation among sets of four parallel outputs from a memory 51, which outputs are spatially adjacent samples of a function F(a,b) of two orthogonal variables a and b expressed in binary numbers respectively supplied from sources 10 and 50. The variables a and b have respective integral portions int a and int b used as input addresses to ROM 51, and they have respective fractional portions frac a and frac b. Single-bit samples are stored in ROM 51 which, for example, might be a bit-map of a graphic image to be reproduced on a television display screen; in such case the variables a and b might be descriptive of a phantom raster scan scanning the memory so as to present the image on the display screen with a programmable degree of rotation. ROM 51 is arrnged to respond to int a, int b addressing to supply samples $S_{a,b}$, $S_{(a+1),b}$, $S_{a,(b+1)}$, and $S_{(a+1),(b+1)}$ at locations in ROM 51 which map points with coordinates corresponding respectively to their subscripts.

The single-bit samples $S_{a,b}$, $S_{(a+1)b}$ are linearly interpolated in the direction of change in a by select one-of-four decoder 12 in the same way $S_a$ and $S_{(a+1)}$ are linearly interpolated between in the FIG. 1 interpolation apparatus. Analogously, $S_{a,(b+1)}$ and $S_{(a+1),(b+1)}$ are linearly interpolated between in the direction of change in a by a select one-of-four decoder 52.

The first and second intermediate interpolation results supplied by select one-of-four decoders 12 and 52, respectively, are plural-bit binary numbers; and they are linearly interpolated between in the b direction using an interpolator 55 similar to that in FIG. 3, to yield a final interpolation result, the two-dimensionally interpolated value of F(a,b). Interpolator 55 receives frac b as the less significant bits in the output from source 50 and $\overline{\text{frac b}}$ from the output of a complementor circuit 53 receiving frac b at its input.

Variants of the FIG. 4 interpolation apparatus wherein interpolator 55 is replaced by the other interpolation apparatus, such as found in the prior art, also embody the present invention in certain of its aspects and are advantageous over the other apparatus for performing two-dimensional interpolation. FIG. 5 shows an interpolator that can replace interpolator 55 in the FIG. 4 circuitry. The first intermediate interpolation result in subtracted from the second in a subtractor 56, and the difference is multiplied by frac b in multiplier 57. The resulting product is then added back to the first intermediate interpolation result in an adder 58 to provide the final interpolated value of F(a,b). This configuration can use an off-the-shelf digital multiplier 57 and may be more convenient to use in an application where the two-dimensional interpolator is not included in an integrated circuit with the ROM 51.

Consider finally the nature of the complementor circuits 13 and 53. Where frac a and frac b terms have several bit places, their complements $\overline{\text{frac a}} = (1 - \text{frac a})$ and $\overline{\text{frac b}} = (1 - \text{frac b})$ are closely approximated by simply replacing each ONE in the binary numbers with a ZERO and each ZERO with a ONE. This may, for example, be done by applying each bit place as the first input to a respective exclusive OR gate, the second input of which has a ONE continuously applied to it, and by using the ensemble of the exclusive OR gate outputs in same order as their first inputs to furnish the complement. Exact complementing may be obtained by adding a ONE in the least significant bit place to the approximate complement, with compensating delays for this addition in forming frac a and frac b being introduced with the frac a, frac b, int a and int b inputs to the interpolator and function memory. Where sources 10 and 50 of variables a and b are counters using cascaded flip-flops complementary outputs may be available from them, without need for separate complementor circuits.

What is claimed is:

1. In combination:
means for supplying binary numbers descriptive of a variable, each binary number having an integral portion and at least some of them, at times having fractional portions;
a memory, having storage locations addressable in terms of integral portions of said variable for storing plural-bit-binary-number digital samples of a function of said variable, and responding to the integral portion of each number descriptive of said variable to supply a pair of digital samples associated with that integral portion and with that integral portion as incremented by unity; and
means for accumulating a number of terms corresponding to the number of bits in said digital samples to generate a linear interpolation between each pair of samples, each successive term being shifted in all its places in the direction of increased significance by a number of bits equal to the power of two which is described by each successive place in both of said pair of digital samples, and each successive term being generated responsive to those places in said both of said pair of digital samples, said means for accumulating including
means for selecting zero for each term for which the corresponding places in both digital samples are ZEROs,
means for selecting unity for each term for which the corresponding places in both digital samples are ONEs,
means for selecting the fractional portion of said variable for each term for which the corresponding place of the digital sample associated with the integral portion of said variable is a ZERO and the corresponding place of the digital sample associated with the integral portion of said variable as incremented by unity is a ONE,
means for generating the complements of the fractional portions of said binary numbers, and
means for selecting the complement of the fractional portion of said variable for each term for which the corresponding place of the digital sample associated with the integral portion of said variable is a ONE and the corresponding place of the digital sample associated with the integral portion of said variable as incremented by unity is a ZERO.

2. In the combination set forth in claim 1 said means for generating the complements of the fractional portions of said binary numbers being of a type which generates the complements on a continuous basis.

3. In the combination set forth in claim 1 said means for generating the complements of the fractional portions of said binary numbers being of a type which generates the complements only when they are selected.

4. In combination:
means for supplying binary numbers descriptive of a variable, each binary number having an integral portion and at least some of them at times having fractional portions;
a memory, having storage locations addressable in terms of integral portions of said variable for storing single-bit-binary-number digital samples of a function of said variable, and responding to the integral portion of each number descriptive of said variable to supply a pair of digital samples associated with that integral portion and with that integral portion as incremented by unity; and
means for performing linear interpolation between each pair of samples including
means for selecting zero as the linear interpolation result when both digital samples are ZEROs,
means for selecting unity as the linear interpolation result when both digital samples are ONEs,
means for selecting the fractional portion of the number responsive to the integral portion of which the digital samples are extracted, as the linear interpolation result, when the digital sample associated with the integral portion of that number is a ZERO and the digital sample associated with the integral portion of that number as incremented by unity is a ONE,
means for generating the complements of the fractional portions of said binary numbers, and
means for selecting the complement of the fractional portion of the number responsive to the integral portion of which the digital samples are extracted, as the linear interpolation result, when the digital sample associated with the integral portion of that number is a ONE and the digital sample associated with the integral portion of that number as incremented by unity is a ZERO.

5. In the combination set forth in claim 4 said means for generating the complements of the fractional portions of said binary numbers being of a type which generates the complements on a continuous basis.

6. In the combination set forth in claim 4 said means for generating the complements of the fractional portions of said binary numbers being of a type which generates the complements only when they are selected.

7. A combination as set forth in claim 1 or 4 wherein the function of said variable stored in said memory is a one-dimensional function that is a function of no other variable.

8. In combination:
means for supplying successive pairs of binary numbers respectively descriptive of first and second variables, each variable having a respective integral portion and at least at times having a respective fractional portion;
means for generating the complements of the fractional portions of said first and second variables;
a memory having storage locations for storing single-bit-binary-number digital samples of a two-dimensional function of said first and second variables said memory being responsive to integral portions of such successive pair of binary numbers respectively descriptive of said first and second variables for supplying digital samples of said two-dimensional function at first storage location coordinates equal to those integral portions, at second storage location coordinates respectively equal to the integral portion of the first variable incremented by unity and to the integral portion of the second variable, at third storage location coordinates respectively equal to the integral portion of the first variable and to the integral portion of the second variable incremented by unity, and at fourth storage location coordinates respectively equal to the integral portion of said first variable incremented by unity and to the integral portion of said second variable as incremented by unity;

means for obtaining a first intermediate interpolation result by linearly interpolating between the digital samples at said first coordinates and at said second coordinates in accordance with the fractional portion of said first variable, which means includes means for selecting zero as said first intermediate interpolation result responsive to the digital samples at said first coordinates and at said second coordinates both being ZEROs, means for selecting unity as said first intermediate interpolation result responsive to the digital samples at said first coordinates and at said second coordinates both being ONEs, means for selecting the fractional portion of said first variable as said first intermediate interpolation result responsive to the digital samples at said first coordinates and at said second coordinates being respectively a ZERO and a ONE, and means for selecting the complement of the fractional portion of said first variable as said first intermediate interpolation result responsive to the digital samples at said first coordinates and said second coordinates being respectively a ONE and a ZERO;

means for obtaining a second intermediate interpolation result by linearly interpolating between the digital samples at said third coordinates and at said fourth coordinates in accordance with the fractional portion of said first variable, which means includes means for selecting zero as said second intermediate interpolation result responsive to the digital samples at said third coordinates and at said fourth coordinates both being ZEROs, means for selecting unity as said second intermediate interpolation result responsive to the digital samples at said third coordinates and at said fourth coordinates both being ONEs, means for selecting the fractional portion of said first variable as said second intermediate interpolation result responsive to the digital samples at said third coordinates and at said fourth coordinates being respectively a ZERO and a ONE, and means for selecting the complement of the fractional portion of said first variable as said second intermediate interpolation result responsive to the digital samples at said third coordinates and at said fourth coordinates being respectively a ONE and a ZERO; and means for obtaining a final interpolation result, which is the interpolated value of said two-dimensional function, by linearly interpolating between the said first and said second intermediate interpolation results in accordance with the fractional portion of said second variable.

9. In the combination set forth in claim 8 said means for generating the complements of the fractional portions of said binary numbers being of a type which generates the complements on a continuous basis.

10. In the combination set forth in claim 8 said means for generating the complements of the fractional portions of said binary numbers being of a type which generates the complements only when they are selected.

11. In combination:

means for supplying binary numbers descriptive of a variable, each variable having an integral portion and at least at times having a fractional portion;

means for generating the complement of the fractional portion of said variable;

a memory, having storage locations addressable in terms of integral portions of said variable for storing plural-bit-binary-number digital samples of a function of said variable, and responding to the integral portion of each number descriptive of said variable to supply the pair of digital samples associated with that integral portion and with that integral portion as incremented by unity;

apparatus for summing modified partial products for generating a linear interpolation between said pair of digital samples; and a respective one-of-four selection apparatus controlled by bit places of like power of two from each of said digital samples, for selecting zero for the modified partial product associated with those bit places when they both are ZEROs, for selecting unity for the modified partial product associated with these bit places when they both are ONEs, for selecting the fractional portion of said variable for the modified partial product associated with those bit places when the bit place, from the digital sample at the storage location associated the integral portion of said variable is ZERO and the bit place from the other digital sample is ONE, and for selecting the complement of the fractional portion of said variable for the modified partial product associated with those bit places when the bit place from the digital sample at the storage location associated with the integral portion of said variable is ONE and the bit place from the other digital sample is ZERO.

12. In the combination set forth in claim 11 said means for generating the complements of the fractional portions of said binary numbers being of a type which generates the complements on a continuous basis.

13. In the combination set forth in claim 11 said means for generating the complements of the fractional portions of said binary numbers being of a type which generates the complements only when they are selected.

* * * * *